(12) United States Patent
Fahldieck

(10) Patent No.: US 9,403,647 B2
(45) Date of Patent: Aug. 2, 2016

(54) DEVICE FOR GRIPPING AND HOLDING CONTAINERS

(71) Applicant: KHS GmbH, Dortmund (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/648,743

(22) PCT Filed: Oct. 10, 2013

(86) PCT No.: PCT/EP2013/003049
§ 371 (c)(1),
(2) Date: Jun. 1, 2015

(87) PCT Pub. No.: WO2014/086441
PCT Pub. Date: Jun. 12, 2014

(65) Prior Publication Data
US 2015/0314966 A1  Nov. 5, 2015

(30) Foreign Application Priority Data

Dec. 4, 2012 (DE) .......................... 10 2012 111 753

(51) Int. Cl.
*B25J 15/02* (2006.01)
*B65G 47/86* (2006.01)
*B65G 47/90* (2006.01)
*B67C 3/24* (2006.01)

(52) U.S. Cl.
CPC .............. *B65G 47/847* (2013.01); *B65G 47/90* (2013.01); *B67C 3/242* (2013.01)

(58) Field of Classification Search
USPC .......... 294/116, 201, 202, 115, 203, 99.1, 90; 414/734; 198/803.3, 803.7, 803.9
See application file for complete search history.

(56) References Cited

U.S. PATENT DOCUMENTS

| | | | | |
|---|---|---|---|---|
| 2,482,576 | A * | 9/1949 | Comstock | B65G 7/12 294/115 |
| 3,825,293 | A | 7/1974 | Schwarz | |
| 4,299,532 | A * | 11/1981 | Bouwmeester | B65G 7/847 198/346.2 |
| 8,191,948 | B2 * | 6/2012 | Preti | B65G 47/847 294/106 |
| 2011/0089003 | A1 * | 4/2011 | Fahldieck | B65G 29/00 198/803.1 |
| 2011/0180374 | A1 * | 7/2011 | Fahldieck | B65G 47/847 198/617 |
| 2011/0203906 | A1 * | 8/2011 | Fahldieck | B67G 3/242 198/617 |
| 2011/0308666 | A1 * | 12/2011 | Bodtlander | B67C 3/242 141/165 |
| 2011/0308916 | A1 * | 12/2011 | Fahldieck | B65G 47/846 198/470.1 |
| 2012/0056062 | A1 * | 3/2012 | Fahldieck | B65G 47/847 248/309.4 |
| 2012/0241407 | A1 * | 9/2012 | Fahldieck | B65G 47/847 215/386 |

FOREIGN PATENT DOCUMENTS

| | | |
|---|---|---|
| DE | 195 32 092 | 3/1997 |
| DE | 297 13 510 | 8/1998 |
| DE | 10 2008 019766 | 4/2009 |
| DE | 10 2010 052348 | 5/2012 |
| EP | 2 279 143 | 2/2011 |
| EP | 2 295 352 | 3/2011 |

\* cited by examiner

*Primary Examiner* — Paul T Chin
(74) *Attorney, Agent, or Firm* — Occhiuti & Rohlicek LLP

(57) ABSTRACT

A gripping-and-holding device for gripping and holding containers has a support body, pivotable spring-loaded gripper arms on the support body, three securing elements, two of which are on the gripper arms, and a traction spring that exerts a force towards a center defined between its first and second spring ends. The first two securing elements secure the traction spring. Meanwhile, a first end of the third securing element engages the traction spring outside its spring ends. Its second end is arranged on the support body.

12 Claims, 4 Drawing Sheets

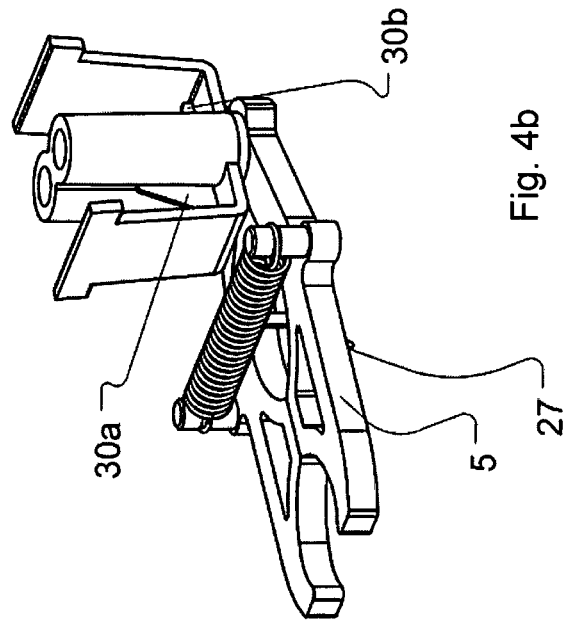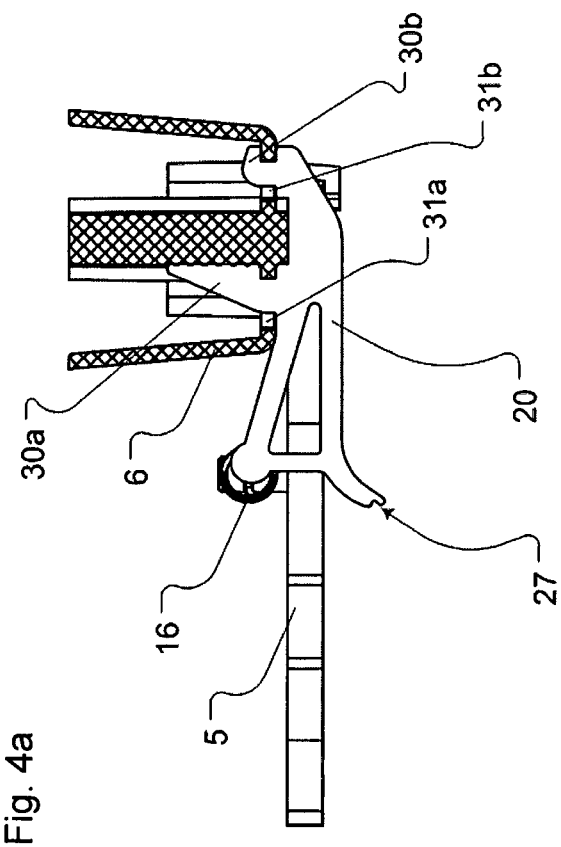

DEVICE FOR GRIPPING AND HOLDING CONTAINERS

RELATED APPLICATIONS

This application is the national stage, under 35 USC 371, of PCT/EP2013/003049, filed on Oct. 10, 2013, which claims the benefit of the Dec. 4, 2012 priority date of DE102012111753.5, the contents of which are herein incorporated by reference.

FIELD OF INVENTION

The invention relates to container processing, and in particular, to gripping and holding containers in container treatment plants.

BACKGROUND

Many solutions for guiding and holding bottles on their path through a container-treatment plant are known. Some of these solutions involve turning the bottles. Others involve only securely guiding and gripping the bottles.

In one known solution, a rotor has pivotably mounted grippers on a support plate. These grippers have ends opposite their gripping cheeks. A pressure spring between these ends forces these gripper arms into a closed position. By compressing the spring, it is possible for bottles to be pushed in or pulled out via slanted inlets on the front sides on the gripper arms.

In another example, a gripping and holding device has a securing element between bearing ends of the gripper arms. These bearing ends have a recess on the edge. This results in gripper arms that can be inexpensively and simply changed even without tools. In particular, by releasing the spring tension and then twisting the gripper arms into an extreme open position, it is possible to easily release the gripper arms from being fixed and to do so without tools.

Also known are gripper arms having deformable mounting tabs made of elastic material on a support body for fixing on the transport element. The mounting tabs effect a clamping position on securing elements of the transport element. The securing elements have flat-plate heads or washers that prevent the deformable mounting tabs from falling out.

SUMMARY

The invention provides a gripping and holding device that urges the gripper arms to be permanently centered in a central position in the event of laterally acting deflection force.

In one embodiment, the invention features a securing element having a securing-end that engages a traction spring and another end arranged on the support body.

In another embodiment, a securing element is T-shaped with a securing-end arranged as a head bar perpendicular to a main bar that connects to the securing-end and extends to one end of the securing element.

It is expedient if the head bar is made rounded with its engaging section engaging an energy-storage element, such as a traction spring. A holding section on the head bar opposite the engaging section has a hook-type recess. The energy-storage element store can be suspended in the recess preferably without the use of tools.

The securing element is placed with its head bar, preferably with the rounded engaging section, between two windings of the traction spring. In a preferred embodiment, the rounded engaging section is at the center of the traction spring between two windings.

In another embodiment, the rounded engaging section is introduced between two adjacent windings of the traction spring in such a way that the rounding of the engaging section lies against the internal circumference of the central winding arranged between the adjacent windings.

In another embodiment, the head bar, and thus its rounded engaging section has a thickness such that a clamping position is achieved between two adjacent windings of the traction spring.

In some embodiments, the securing element is connected in a positionally secure way to the support body using at least one insertion groove on a main bar thereof. Among these embodiments are those in which the insertion groove is arranged on an underside of the securing element on which a hook-type recess of the head bar is also arranged. The insertion groove is preferably made such that a corresponding engaging bar of the support body engages the engaging groove, for example by clamping.

Other embodiments have two or more insertion grooves. The insertion grooves are spaced apart from each other seen in the axial direction of the securing element in order to further increase the positionally stable connection to the support body.

In some embodiments, the securing element is a plate. Among these are embodiments in which the plate is a spring plate. These embodiments include those in which the plate is made of a stainless steel. The securing element can thus also be described as a spring plate. The securing element accompanies and supports the spring should it veer sideways in the circumferential direction or crosswise to the gripper arms.

Although a securing element that is made of spring steel offers advantages, the securing element can also be made of a plastic. The use of plastic enables the securing element to be more easily made in one piece. For example, elements such as the head bar, the main bar, the rounded engaging section, the hook-type recess, and the insertion groove can be integrated into one piece. In some of these embodiments, the securing element and support body with its functional elements form a single monolithic body.

In some embodiments, the securing element is elastic so as to achieve additional give, and to suppress the likelihood of an overload.

In one embodiment, the securing element effectively divides the traction spring into two individual springs by engaging centrally in the traction spring relative to the axial extension. This forms two partial lengths of spring, each of which is the same size.

The division of the traction spring into what are effectively two individual springs that is thus achieved is effective for a sideways deflection, and leaves the gripper arms in their central position even in the event of a laterally acting deflection force. In operation, as the gripper arms open and close, the securing element avoids adversely affecting the function of the traction spring. The securing element is simple and inexpensive to make. In addition, it is easy to connect it to the support body. One only has to push it into grooves of the support body. This creates an open structure that is easy to clean.

In some embodiments, the support body is made as a plastic element that can interlock with a transport element. Engagement openings are arranged in the transport element. The transport element can be repeatedly connected to and released from the engaging elements on the support body. The transport element can be made as a circular disk so that a star transporter is formed on which the support bodies can be secured.

Due to the engaging connection, the support body can be separated in its entirety quickly and simply from and also re-connected to the transport element. The securing element itself as a unit can also be easily and simply replaced or removed from the support body. Because it can be easily and simply replaced, damage arising in a crash can be promptly eliminated.

In one aspect, the invention features an apparatus for use in a container-treatment plant having a transport element for transporting containers. Such an apparatus includes a gripping-and-holding device for gripping and holding the containers. This device has a support body, pivotable spring-loaded gripper arms, three securing elements, and a traction spring that exerts a force towards a center defined between its first and second spring ends. The support body, which can be fixed to the transport element, has pivotable spring-loaded gripper arms. The first and second securing elements, which are on the gripper arms, secure the traction spring. Meanwhile, a first end of the third securing element engages the traction spring outside its spring ends. Its second end is arranged on the support body.

In some embodiments, the third securing element is made of a plastic.

Also included are embodiments in which the spring ends comprise spring eyes, and embodiments in which the spring ends comprise end rings.

In other embodiments, the third securing element comprises a plate. Among these are embodiments in which the third securing element comprises a spring plate that is made of steel.

In yet other embodiments, the third securing element has a T-shaped design that comprises a head bar and a main bar that are perpendicular to each other. Among these are embodiments in which the third securing element comprises an engaging section on the head bar, and wherein the engaging section is rounded. Also among these embodiments are those in which the third securing element comprises a receiving section on the head bar, and a hook-type recess arranged in the receiving section. Also among these embodiments are those a hook-type recess is on an underside of the third securing element, and an insertion groove is on the main bar. In some embodiments, the insertion groove is on the main bar. In others, the head bar is between two windings of the traction spring. These windings can be at the middle of the traction spring.

BRIEF DESCRIPTION OF THE DRAWINGS

The invention is explained in more detail below by means of the figures using two exemplary embodiments. In the figures.

FIGS. 4a and 4b show views of an alternative embodiment of the gripping and holding device.

In the various figures, the same parts are always given the same reference symbols, and hence they are generally also only described once.

DETAILED DESCRIPTION

Figure 1:
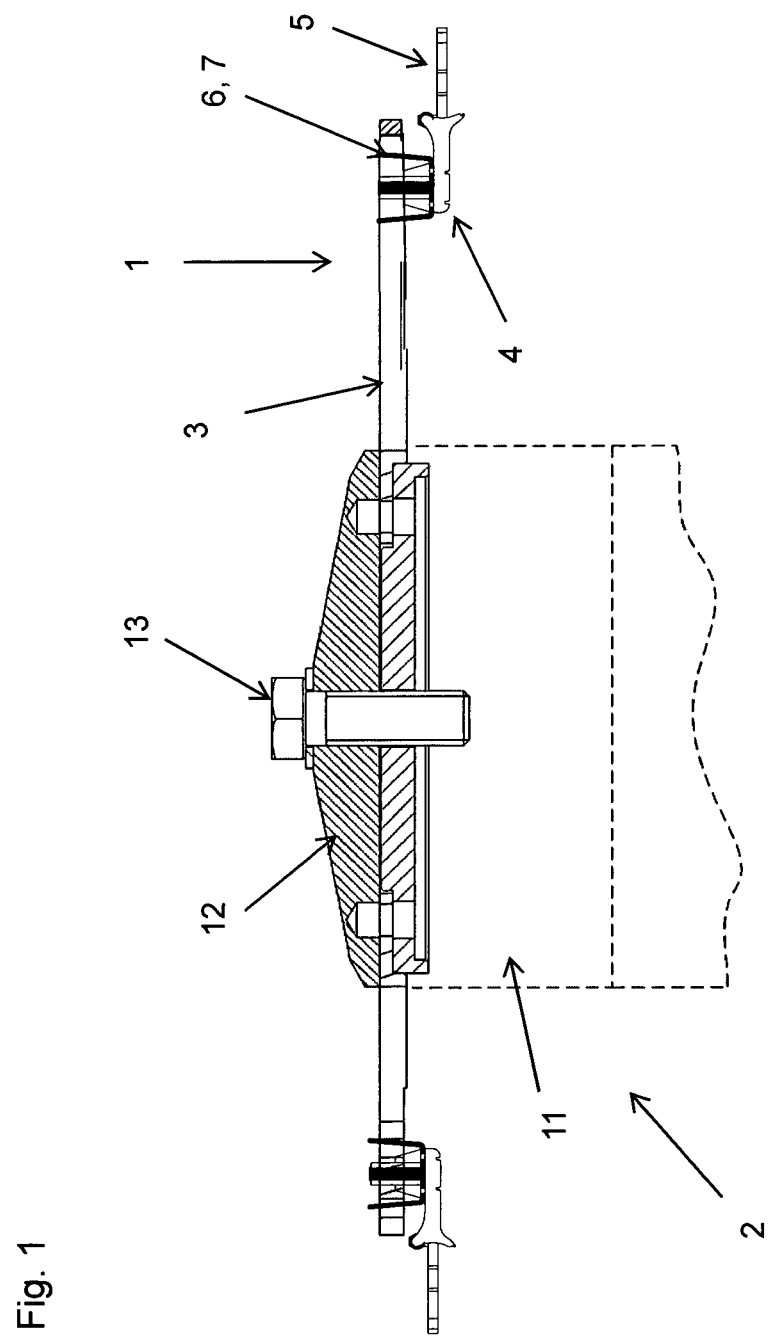
FIG. 1 shows a longitudinal section of a device that is connected to a transport element for gripping and holding.

FIG. 1 shows a device 1 for gripping and holding containers in a container treatment plant 2. The containers are typically bottles, such as PET bottles. The device 1 has a support body 4 that can be fixed on a transport element 3, with pivotable spring-loaded gripper arms on the support body 4.

Figure 2:
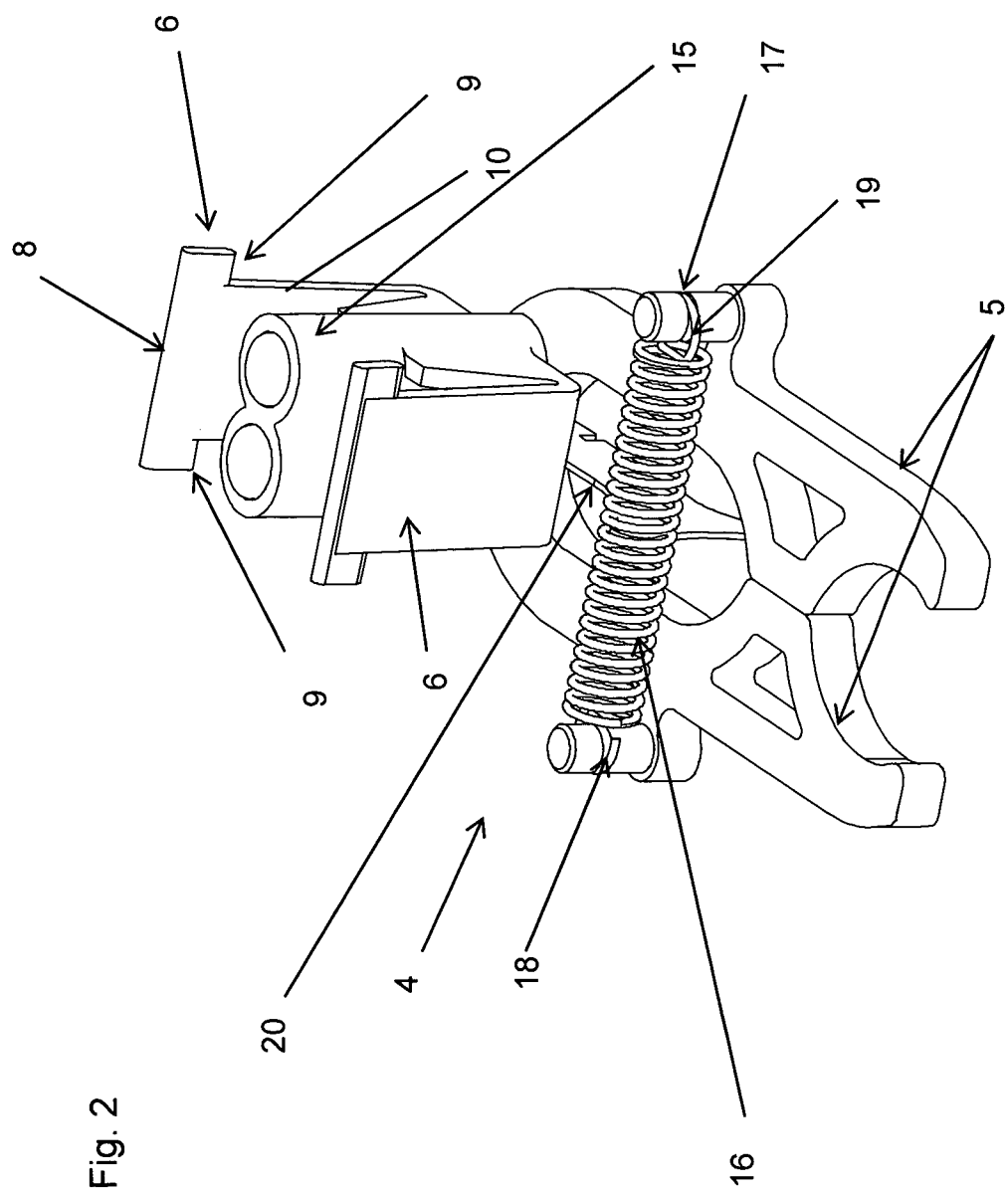
FIG. 2 shows a perspective view of the device shown in FIG. 1, without the transport element.

The support body 4 has an engaging element 6, best seen in FIG. 2. The engaging element 6 engages corresponding counter-engaging elements 7 on the transport element 3. As a result, the support body 4 can be interlocked with the support element 3. An example of an engaging element 6 is a spring bar that has protrusions 9 on its head piece 8.

The counter-engagement elements 7 on the transport element 3 comprise a first partial opening and a second partial opening. The first partial opening is larger than the second partial opening.

The first partial opening is adapted to the head section 8 with its protrusions 9. As a result, the spring bar 6 can be guided through the first partial opening by its head section 8.

The first partial opening transitions directly into the second partial opening. The second partial opening is adapted to a high bar 10 underneath the head section 8. If the head section 8 is now guided completely through the first partial opening, the spring bar 6 can spring into the second partial opening under spring force. In another embodiment, the spring bar 6 snaps into the second partial opening under spring force. In either case, the spring bar 6 still has some pre-tension.

The head section 8 projects by its protrusions 9 laterally over the second partial opening and thus lies on the transport element 3. The engaging connection thus created ensures a secure positioning of the support body 4 on the transport element 3 even when there is vibration. Another advantage of the engaging connection is that it becomes possible to carry out fitting and removal without tools.

The container treatment plant 2 can be a filling machine having a shaft 11 connected to the transport element 3. In one embodiment, the transport element 3 comprises plural arc elements, each of which connects to the shaft 11. In another embodiment, the transport element 3 is a single circular disk.

In either case, a screw 13 connects a cap element 12, which is on the transport element 3, to the shaft 11 and thus holds the transport element 3 in a positionally stable manner. This forms a star transporter or a rotating treatment machine.

Other securing options are also feasible and different designs of the transport element are possible.

Another embodiment of the engaging element 6 includes multiple spring bars on the support body 4, two of which are shown. The spring bars arranged opposite each other on either side of a rotary holder 15 that also receives the pivot pins of the gripper arms 5.

FIG. 2 shows a traction spring 16 extending across the gripper arms 5. First and second ends of the traction spring 16 are fixed on corresponding first and second securing elements 17. Each securing element 17 comprises a fixing spigot that has a peripheral annular groove 18. The first and second ends of the traction spring 16 engage the annular groove 18. Engagement and disengagement of the traction spring 16 can be carried out without the use of tools. Embodiments include those in which the first end of the traction spring 16 is a spring eye. In other embodiments, the first end of the traction spring 19 is an end ring.

Figure 3:
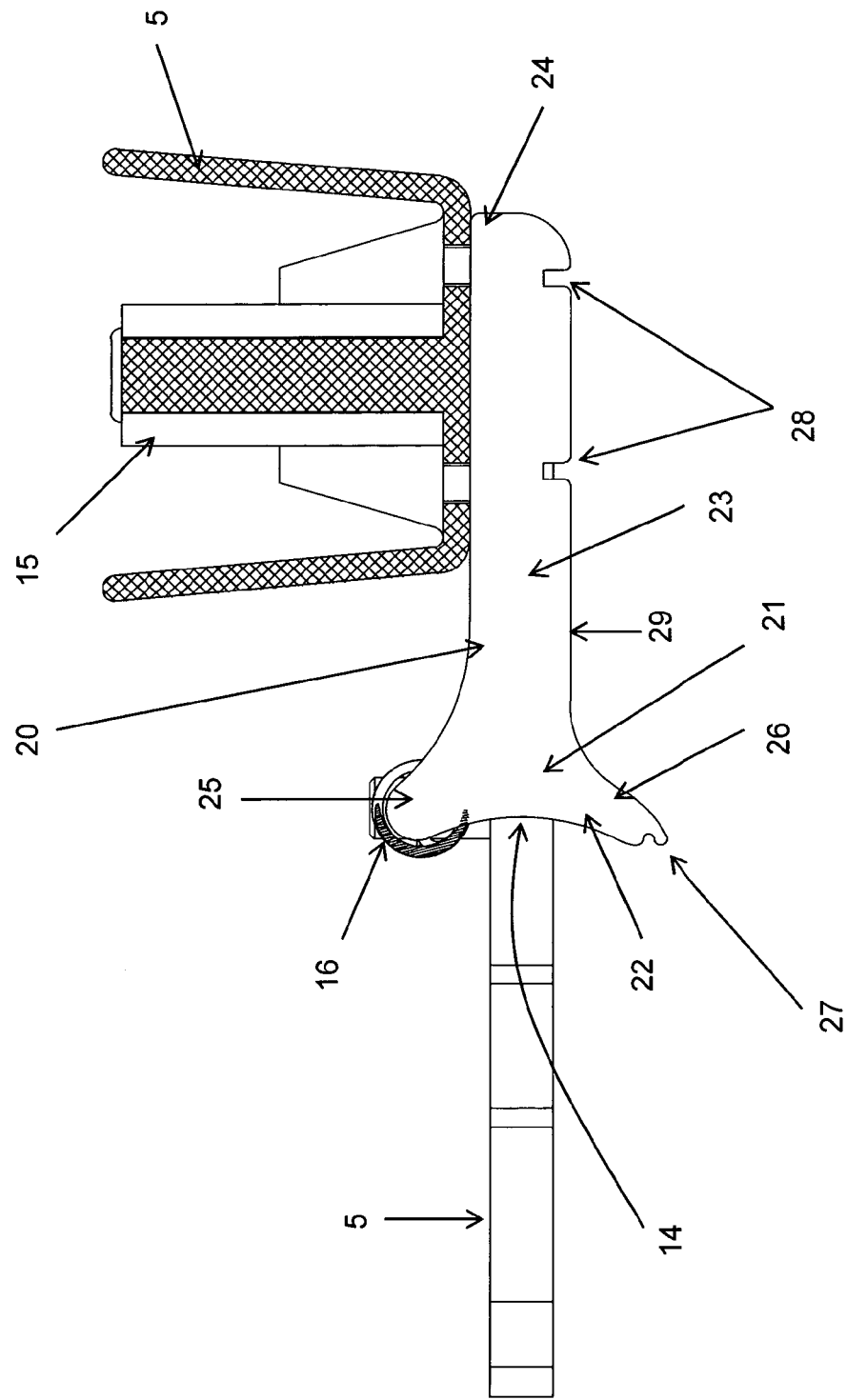
FIG. 3 shows a longitudinal section of the device shown in FIG. 1, without the transport element.

FIG. 3 shows a third securing element 20 having a first end 21 and a second end 24. The first end 21 is a fixing end that engages the traction spring 16. The second end is arranged on the support body 4, which cannot be seen in FIG. 3 as a result of the sectional view selected.

In the particular embodiment of FIG. 3, the third securing element 20 is a T-shaped structure having a first end 21 arranged as a head bar 22 perpendicular to a main bar 23 that is connected to the first end 21 and extends through to the second end 24. The head bar 22 has a free edge 24. In the embodiment shown, the free edge 24 is bent so as to be arch-shaped.

It can be advantageous for the engaging section 25 to be rounded and for a receiving section 26 opposite the engaging section 25 to have a hook-type recess 27. An energy-storage element can then be suspended in the recess 27 preferably without the use of tools. A suitable energy-storage element is a spring similar to the traction spring 16.

In the embodiment shown in FIG. 2, the third securing element 20 is fixed with its head bar 22 with its rounded engaging section 25 between two windings of the traction spring 16. In the embodiment shown, the third securing element 20 is fixed between two windings in the center of the traction spring 16.

As can further be seen in FIG. 3, the third securing element 20 has a main bar 23 that has first and second insertion grooves 28. The insertion grooves 28 are arranged on an underside 29 of the third securing element 20 on which the hook-type recess 27 of the head bar 22 is also arranged. Each insertion groove 28 is preferably made such that a corresponding engaging bar of the support body 4 can engage in a clamping manner in the insertion groove 28.

FIGS. 4a and 4b show an alternative embodiment in which the third securing element 20 has first and second claw-like engaging sections 30a, 30b. The claw-like engaging sections 30a, 30b can be fed through one or two slot-like notches 31a, 31b of the support body 4 along a feed direction. They are then pushed in a direction crosswise to the feed direction in such a way that notches in the claw-type engaging sections 30a, 30b engage.

In some embodiments, the third securing element 20 is made from a plate. Among these are embodiments in which the plate is a steel spring plate. This improves resetting and centering following a deflection in the circumferential direction. In yet other embodiments, the third securing element 20 is elastic. Such a third securing element 20 prevents the traction spring 16 from being pushed off its bracket and falling in the event of a strong deflection in the circumferential direction.

Having described the invention, and a preferred embodiment thereof, what is claimed as new and secured by Letters Patent is:

1. An apparatus for use in a container-treatment plant having a transport element for transporting containers, said apparatus comprising a gripping-and-holding device for gripping and holding said containers, said gripping-and-holding device comprising a support body, pivotable spring-loaded gripper arms, first and second securing elements, a third securing element, and a traction spring, wherein said traction spring comprises first and second spring ends, wherein said support body is configured to be fixed to said transport element, wherein said support body comprises said pivotable spring-loaded gripper arms, wherein said first and second securing elements secure said traction spring, wherein said traction spring exerts a force in a closing direction, said closing direction being a direction towards a center of said spring, wherein said securing elements are arranged on said gripper arms, wherein said third securing element comprises a first end that engages said traction spring between said spring ends, a second end arranged on said support body, a head bar and a main bar that intersect said main bar.

2. The apparatus of claim 1, wherein said third securing element comprises an engaging section on said head bar, and wherein said engaging section is rounded.

3. The apparatus of claim 1, wherein said third securing element comprises a receiving section, and a hood-type recess, wherein said receiving section is on said head bar, and wherein said hook-type recess is arranged in said receiving section.

4. The apparatus of claim 1, wherein said head bar is between two windings of said traction spring.

5. The apparatus of claim 4, wherein said two windings are at the middle of said traction spring.

6. The apparatus of claim 1, further comprising an insertion groove, wherein said insertion groove is on said main bar.

7. The apparatus of claim 1, wherein said third securing element comprises an underside, a hook-type recess, and an insertion groove, wherein said hook-type recess is on said underside, wherein said hook type recess is arranged on said head bar, and wherein said insertion groove is on said main bar.

8. The apparatus of claim 1, wherein said third securing element comprises a plate.

9. The apparatus of claim 8, wherein said third securing element comprises a spring plate, and wherein said spring plate is made of steel.

10. The apparatus of claim 1, wherein said third securing element is made of a plastic.

11. The apparatus of claim 1, wherein said spring ends comprise spring eyes.

12. The apparatus of claim 1, wherein said spring ends comprise end rings.

* * * * *